Patented Feb. 8, 1949

2,461,192

UNITED STATES PATENT OFFICE 2,461,192

METHOD OF RECLAIMING SCRAP VULCANIZED RUBBER

Fernley H. Banbury, Woodmont, Donald A. Comes, Woodbridge, and Carl F. Schnuck, New Haven, Conn., assignors to Lancaster Processes, Inc., New York, N. Y., a corporation of New York No Drawing. Application July 31, 1947,
Serial No. 765,256

20 Claims. (Cl. 260—5)

This invention relates to a method of treating scrap vulcanized rubber in order to prepare or condition the same for re-vulcanization and reuse.

More particularly, the invention is concerned with a method for reclaiming vulcanized scrap rubber by thermo-mechanical means as distinguished from chemical or thermo-chemical methods of reclaiming rubber.

In the patent to Robinson No. 2,221,490, there is described a thermo-mechanical process for reclaiming vulcanized rubber by subjecting the vulcanized rubber to mechanical action in an internal mixer, such as that well known as the Banbury mixer, while in the presence of steam formed during the action from moisture contained in or water added to the scrap being treated. The Banbury mixer comprises essentially a pair of cylindrical chambers arranged side by side and in communication, within each of which is mounted a bladed rotor, and a pneumatically operated ram for holding the material to be treated within the sphere of action of the rotors. This form of mixer has found extensive use in the rubber industry for mixing and massing of rubber compounds. In the use of this apparatus for reclaiming vulcanized rubber according to the process of the Robinson patent above-identified, the scrap vulcanized rubber is disintegrated by the action of the rotors and the pieces are rubbed against one another and smeared along the walls of the chambers until the particles cohere into a soft plastic mass, water being added to the stock from time to time so as to prevent the temperature of the mass from substantially exceeding 300° F., the steam thus generated serving also to assist in plasticizing the rubber. The time required to plasticize the vulcanized rubber by the process of the Robinson patent to a condition where it can be sheeted and refined for use as reclaim rubber is of the order of 40 minutes or more, and considering the power consumed in actual operation of the process, the cost per pound of reclaim rubber produced thereby is relatively high. Moreover, the process of the Robinson patent has not been capable of successfully reclaiming vulcanized synthetic rubbers or mixtures of such rubbers and vulcanized natural rubber.

The present invention provides an improvement in the process of the Robinson patent. The invention makes possible the production of reclaim rubber by thermo-mechanical means with a substantial shortening of the time required for the operation and consequent reduction in the cost per pound of reclaim rubber obtained thereby and with improvement in the quality of the reclaim obtained from the particular scrap being treated. The invention also is adapted for reclaiming vulcanized rubbers, including synthetic rubber, which could not be profitably reclaimed by the process of the Robinson patent.

According to the present invention, vulcanized rubber is reclaimed by subjecting it to intense mechanical action in a confined working space so as to produce high internal friction and shear in the material, the material being confined in said working space under a relatively high mechanical compression enabling the mechanical action to bring about a high input of mechanical energy at a very rapid rate.

In general, the input of mechanical energy is such as to reach a peak of not substantially less than 3 horsepower per pound, with an average not substantially less than 1.5 horsepower, preferably about 2 horsepower per pound of material being treated, for the period of time required to plasticize it to a condition enabling it to be sheeted, refined and further processed as may be desired.

By operating in this manner, the vulcanized rubber can be plasticized and converted into suitable grades of reclaim by the mechanical action, without the necessity of adding external heat—such as by preheating the rubber or preheating the working surfaces of the apparatus in which the mechanical action is performed.

The above indicated input of mechanical energy is brought about by the speed of the rotors or other elements exerting the shearing action upon the material and by the mechanical pressure exerted upon the material while the rotors plow through it.

The process of the present invention, like the process described in the Robinson patent, may be practiced by the use of an internal mixer such as the Banbury mixer. Instead of the standard two-rotor mixer, a single rotor internal mixer may be employed. However, in order to obtain the high input of mechanical energy contemplated by the present invention, it is necessary that the ram exert upon the material in the working chamber a pressure of 50 to 250 pounds per square inch, desirably 80 to 160 pounds per square inch. For that purpose, the pneumatic cylinder for operating the ram may be enlarged and higher pneumatic pressures may be utilized for operating the ram. Considering, for example, a size 3-A Banbury mixer of standard construction, which has a pneumatic cylinder of 8" diameter, viz., a cross-sectional area of 50.265 square inches, and a ram whose working surface has an area of 252 square inches, an air pressure of 100 pounds per square inch in the cylinder would provide a maximum pressure of approximately 20 pounds per square inch by the ram upon the material in the working chamber. As above indicated, in the practice of the present invention, the mechanical pressure exerted upon the material in the working chamber while it is undergoing the mechanical action of the rotors, is of the order of 50 to 250 pounds per square inch, desirably 80 to 160 pounds per square inch. In general, the mechanical pressure exerted upon the material in the practice of the present invention is from 2½ to 10 or more times the pressure exerted by the ram of the Banbury mixer as normally constructed and operated in rubber mixing and compounding practice.

In the case of a Banbury mixer of the size above referred to, to be employed in the practice of the present invention, the pneumatic cylinder is enlarged to a diameter not substantially less than 16" (201 square inches cross-sectional area). Hence, a pressure of 100 pounds per square inch in the cylinder for operating the ram (whose working surface has an area of 252 square inches) provides a pressure of 80 pounds per square inch by the ram upon the material in the working chamber. Desirably, also, the air pressure in the cylinder may be increased to 200 pounds per square inch, to make possible the imposition of a pressure of 160 pounds per square inch by the ram upon the material in the working chamber. Also, if desired, the ram for exerting the necessary pressure on the material may be operated by hydraulic or oil pressure instead of air pressure, or by a combination of air pressure and oil or water pressure.

The heavy pressure exerted by the ram serves to force or crowd the material into the working chamber and densify and compact it therein so that it offers maximum resistance enabling the rotors to exert a heavy shearing action thereon as they plough through the densified mass.

In conjunction with the heavy pressure exerted by the ram upon the material in the chamber as above stated, the rotors are driven at a speed two or three times normal. Thus, in the case of a Banbury mixer of the size above-mentioned, the rotors are operated at 70 to 105 R. P. M., as compared to 35 R. P. M. normal for this size machine. Generally speaking, the higher the pressure exerted by the ram, the lower may be the speed of the rotors. The heavy pressure exerted by the ram upon the material in the mixer, together with abnormal speed of the rotors, makes possible a sustained high input of energy as a result of the heavy working of the material, with consequent rapid heating and plasticizing of the vulcanized rubber. By means of this input of energy, the temperature of the scrap may be raised to within the range of approximately 425° to 550° F. and the rubber reclaimed, within a matter of three to twelve minutes, usually less than eight minutes. This is in contrast to the appreciably longer periods of time, usually forty minutes or more, required to reclaim vulcanized rubber by mechanical action in a Banbury mixer operated according to the method of the aforementioned Robinson patent.

In operating our process, we have been able to reclaim certain grades of vulcanized rubber in as little time as three minutes; generally speaking, we have obtained good grades of reclaim from various types of vulcanized rubber in the operation of our process on the basis of four to six cycles per hour, including in each cycle the time required to cool the plasticized rubber in the working chamber before discharging it therefrom.

The process herein described may be used not only for the treatment of waste or scrap vulcanized natural rubber, but also for the treatment of waste or scrap vulcanized synthetic rubber, such as the copolymer of 1,3-butadiene and styrene, commonly known as GR-S, the copolymer of 1,3-butadiene and acrylonitrile, commonly known as Buna N, and the copolymer of isobutylene and isoprene, commonly known as butyl rubber; as well as for the treatment of waste or scrap containing mixtures or blends of such vulcanized synthetic rubber with vulcanized natural rubber. Likewise, it is applicable to any of such rubbers containing fiber as a component, as in the case of scrap vulcanized whole tire, tire carcass, or other scrap in which the rubber is mixed with fiber material.

The term "rubbery butadiene polymer" in the claims is intended to include, generically, natural rubber as well as the so-called synthetic butadiene polymer rubbers, such as the copolymers of the types herein mentioned.

In practicing the process of the invention, the material to be treated is preferably reduced to the form of ground particles ranging in size from say 4 mesh to 20 mesh. To that end, the scrap to be treated may first be cracked to pieces about one-half inch square and then ground to the desired mesh size, for charging into the reclaiming apparatus such as the Banbury mixer hereinabove referred to.

It will be understood that in certain instances, depending upon the quality of the reclaim desired, the scrap may be charged into the apparatus after being cracked, without further grinding to small particles, or even in the form of large pieces or sections.

Having in mind that the high input of mechanical energy contemplated by the present invention necessitates imposition of relative high mechanical pressure upon the material in the working chamber, the quantity of material per batch charged to the working chamber must be such that the pressure exerted by the ram shall force or crowd the material into the mixing chamber so as to densify and compact it to the degree that will enable the rotors to exert the maximum shearing action which will bring about the necessary input of mechanical energy. The quantity of material in each batch must be sufficiently large so that when the full pressure of the ram is applied to the material, the working face of the ram will be within about one-half inch of its limit stops. If the size of the batch is substantially in excess thereof, the portions thereof in the throat or feed neck will not be subjected to the working action of the rotors during the cycle of operation, remaining to contaminate the finished reclaim as tailings. On the other hand, if the size of the batch is substantially less than that indicated, the effectiveness of the ram pressure in increasing the work done on the scrap is lost. The weight of the charge in the case of any given material will depend upon its specific gravity. In the case of a Banbury mixer of the size above mentioned, for example, the weight of material per batch, assuming it has a typical specific gravity of 1.25, will usually vary from about 140 to about 165 pounds. This compares with a batch weight of 100 to 115 pounds for this size Banbury mixer as normally constructed and operated in rubber compounding practice, for stock of 1.25 specific gravity.

Desirably, suitable softening oils in amounts of from say 5% to 15% by weight of the scrap, and attriting powders such as carbon black or Silene (which is a hydrated calcium silicate containing approximately 67% $SiO_2$ and 19% CaO) in amounts of from say 10% to 15% by weight of the scrap, depending upon the nature of the scrap and the quality of reclaim desired to be produced therefrom, may be added to the scrap to assist the reclaiming operation and improve the milling and other properties of the material upon discharge from the working chamber. Generally, small amounts of mill ends, such as tailings from previous batches, also improve the working of the batch.

When the batch of proper weight has been loaded into the mixer, the necessary air pressure is fed to the pneumatic cylinder operating the ram so that the latter will force the material into the working chamber and compact and densify it therein, preferably while the rotors are revolving at the maximum speed. Care should be taken in applying the full pressure of the ram at the beginning of the cycle to avoid overloading and possible stalling of the motor driving the rotors. Depending upon the rate at which the pressure of the ram is applied upon the stock to densify it and bring it into the sphere of action of the rotors, momentary peaks of power demand amounting to 3 to 5 or even more horsepower per pound of stock are attained, within a matter of one or two minutes. Thereafter, the power input drops off as the action of the rotors upon the stock is continued, and the temperature of the stock continues to rise and the rubber becomes plasticized to the point where input of mechanical energy is no longer advantageous. Thereupon, the batch may be discharged from the apparatus. The discharged material will usually be in the form of loosely coherent lumps of discrete particles or pieces, which may readily be sheeted on a conventional rubber mill, and then refined on conventional rubber refiners.

Since, as indicated above, the peak temperatures attained by the batch will be of the order of 425° to 550° F., it is necessary, in order to prevent harmful oxidation of the rubber which would result if it were brought into contact with the atmosphere at such high temperature, to cool it to a temperature of 350° F., or less. Such cooling may be effected by circulating cold water through the jackets with which the working chamber and the rotor or rotors are usually provided, or by injecting water into the mass of material in the working chamber, but preferably by both of these expedients. In either case, the cooling action may be further assisted by reducing the speed of the rotor or rotors. Instead of cooling the plasticized material in the working chamber before being discharged therefrom for delivery to the rubber mill, it may be discharged immediately at the conclusion of the plasticizing cycle, through an enclosed substantially air-sealed conduit directly on to a well cooled rubber mill to be simultaneously cooled and sheeted.

Herebelow are given examples illustrating the process of the invention for the treatment of several different types of scrap vulcanized rubber, utilizing a size 3-A Banbury mixer equipped with a pneumatic cylinder of 16″ diameter for operating the ram which exerts the pressure upon the material in the working chamber while it is subjected therein to the shearing action of the rotors. Except as otherwise indicated in these examples, the air pressure in the cylinder was approximately 100 pounds p. s. i., thus making available a pressure of approximately 80 pounds p. s. i. by the ram; the rotational speed of the rotors was approximately 70 R. P. M. during the period in which the rubber was subjected to the working action of the rotors while under the pressure of the ram; and the speed of the rotors was reduced to approximately 14 R. P. M. after the material had been brought to the desired degree of plasticization, i. e. during the period of cooling the material before discharge from the working chamber of the mixer.

At the start of each batch, the rotors were first brought up to the operating speed indicated, one half the stated amount of rubber scrap was fed into the working chamber, followed by the stated amounts of softening oil and attriting powders, then by the balance of the scrap. Mill ends, if used, were added last. The ram was then brought down on the entire batch, usually with about one-half the full air pressure during about the first half minute, and then with gradual increase to full pressure at about one minute. When the batch reached its maximum temperature as a result of the input of energy, the speed of the rotors was reduced as indicated, the pressure was released from the ram so that it merely rested by its own weight on top of the batch, and the batch was cooled as indicated.

In the several examples, data are given with respect to the physical properties, more particularly the tensile strength, elongation and plasticity (by Mooney plastometer) of cured samples of the resultant reclaim. These data are based upon the so-called Traflet cure. In the case of reclaim which does not contain any fiber, this comprises the curing for 20 minutes at 280° F., a sample $\frac{1}{16}$″ in thickness and composed of 480 grams of the reclaim, mixed with 6 grams of sulfur, 10 grams of zinc oxide, 4 grams of stearic acid, 1 gram of Captax and 0.4 gram of diphenylguanidine. In the case of reclaim which contains fiber, such as obtained from whole tire or tire carcass, the cure is the same as in the foregoing, except that only 390 grams of the reclaim are mixed with the stated amounts of vulcanizing agents, accelerator, etc.

*Example I*

In this example #1 peels of natural rubber passenger tires, ground to 20 mesh were reclaimed. The charge of the mixer was composed of the following:

| | Pounds |
|---|---|
| Ground peels | 106 |
| Mill ends | 15.9 |
| Softening oil, comprising a mixture of equal parts of a coal tar oil and medium pine tar | 11.8 |
| Refined rosin tackifier | 4.1 |
| Carbon black | 10.6 |

Upon application of the full pressure of the ram to the charge of material in the working chamber of the mixer, the power input rose to approximately 600 H. P. within one minute. Thereafter, for the ensuing 7 minutes, the power input varied downwardly from approximately 375 H. P. to approximately 250 H. P. while the temperature of the material gradually increased during this time to approximately 470° F. For the period of 8 minutes during which the rubber was thus subjected to the working action of the rotors while held under the pressure of approximately 80 pounds per square inch by the ram, the H. P. input averaged approximately 2.2 H. P. per pound of material.

When the temperature, at the end of 8 minutes of the working action, reached 470° F., the rubber was cooled by running cold water through the jacketed walls and through the jackets of the rotors and by adding approximately 3 quarts of water to the batch. At the same time, the speed of the rotors was reduced, as above indicated, to approximately 14 R. P. M. The temperature of the batch was thus reduced to approximately 300° F. within 2 minutes, whereupon it was discharged and conveyed to an open rubber mill. One pass of the material through a conventional two-roll rubber mill resulted in a sheet that was soft and tacky and which, upon one pass through a refiner set for sheet thickness of 0.004", furnished a clean, soft and tacky reclaim, the tailings from this refining being approximately 4.9% by weight of the batch.

The thus refined reclaim, when cured in the manner above stated, showed a tensile strength of 1267 pounds p. s. i., an elongation of 258%, a Mooney plasticity of 85, and a specific gravity of 1.19.

*Example II*

In this example, the scrap consisted of No. 1 peels of passenger tires made of GR-S rubber. The peels were ground to 20 mesh. The batch consisted of the following:

|  | Pounds |
|---|---|
| Ground peels | 104 |
| Mill ends | 15.6 |
| Softening oil, comprising a mixture of equal parts of a coal tar oil and medium pine tar oil | 18.8 |
| Resin tackifier | 7.5 |
| Carbon black | 10.4 |

Upon application of the full pressure of the ram, the power input reached approximately 515 H. P. after about ½ minute and fluctuated between approximately 400 H. P. and approximately 200 H. P. during the ensuing 11 minutes, the temperature of the batch gradually increasing during this time to approximately 485° F. The power input averaged approximately 1.6 H. P. per pound of material in the batch. When the batch had reached approximately 485° F., it was then cooled in the same manner as set forth with reference to Example I, the temperature in this instance being thus reduced to approximately 330° F. within 2 minutes time. Thereupon the batch was discharged from the mixer, then sheeted in one pass on the rubber mill, and refined. Refining consisted of one pass through the refiner set to give a sheet thickness of 0.004", and gave a slightly soft, tacky and clean reclaim, with tailings amounting to approximately 4% of the batch. The refined reclaim, cured as above stated, showed a tensile strength of 1318 pounds p. s. i., an elongation of 317%, a Mooney plasticity of 127 and a specific gravity of 1.19.

*Example III*

In this example, the scrap consisted of a mixture of equal parts by weight of No. 1 peels of natural rubber passenger tires and No. 1 peels of passenger tires made of GR-S rubber. The peels were ground to 20 mesh. The batch consisted of the following:

|  | Pounds |
|---|---|
| Ground mixed peels | 120 |
| Softening oil, comprising a mixture of equal parts of a coal tar oil and medium pine tar oil | 18 |
| Resin tackifier | 6 |
| Carbon black | 12 |

With this batch, the rotors were turned at a speed of 104 R. P. M. and the power input at about one minute of application of the full pressure by the ram amounted to approximately 560 H. P., with a slight decrease, to approximately 540 H. P., during the next minute. In the ensuing 5 minutes, the power input fluctuated downwardly between approximately 370 H. P. and 320 H. P., dropping to approximately 285 at the end of this period. During the entire seven-minute cycle of operation, the energy input averaged approximately 2.5 H. P. per pound of material, and the temperature of the batch during this cycle was increased to approximately 505° F. at the end of the cycle. The batch was then cooled by circulating cold water through the jacketed parts of the mixer and by the addition of approximately 6 quarts of water to the batch, the temperature being thus reduced to approximately 250° F. within 3 minutes. The rubber discharged from the mixer was given one pass through the rubber mill, resulting in a sheet which, when refined in one pass through a refiner with the rolls set to give a sheet thickness of 0.003", was a clean, slightly soft and tacky reclaim, the tailings amounting to approximately 8% by weight of the batch. This reclaim, cured as stated, exhibited a tensile strength of 1435 pounds p. s. i., an elongation of 320%, a Mooney plasticity of 110 and a specific gravity of 1.19.

*Example IV*

In this example, the scrap consisted of No. 1 peels of recapped passenger tires. Since the materials used for the recapping of automobile tires varies widely, the composition of the rubber cannot be precisely given. The scrap was ground to 20 mesh and the batch consisted of the following:

|  | Pounds |
|---|---|
| Ground peels | 104 |
| Mill ends (composed of tailings from previous runs of mixtures of equal parts of natural rubber tire peels and GR-S rubber tire peels) | 15.6 |
| Softening oil, comprising a mixture of equal parts of a coal tar oil and medium pine tar oil | 15.6 |
| Resin tackifier | 5.2 |
| Carbon black | 10.4 |

In this instance, at the end of about one minute after the start of the cycle and after the full pressure of the ram had been applied, the power input was approximately 565 H. P. In the ensuring five minutes, the H. P. dropped to approximately 220, this input being maintained for approximately another four minutes. The power input over the total cycle of ten minutes averaged approximately 2.0 H. P. per pound of material. During the cycle, the temperature of the batch was increased to approximately 475° F. At the end of the ten minute cycle, the batch was cooled in the same manner as described with reference to Example I, the temperature of the batch being reduced from 475° to approximately 310°

F. within three minutes, whereupon the batch was discharged from the mixer. One pass through the rubber mill resulted in a sheet that was slightly soft and tacky. Refined in one pass through a refiner set for a sheet thickness of 0.004", this material, though slightly dry, was nevertheless clean. The tailings amounted to 4% by weight of the batch. The refined reclaim when cured as stated, had a tensile strength of 1481 pounds p. s. i., an elongation of 280%, a Mooney plasticity of 132 and a specific gravity of 1.21.

*Example V*

The scrap in this example consisted of untrimmed passenger tire carcass of natural rubber. This scrap was ground to 6 mesh. The batch consisted of the following:

|  | Pounds |
|---|---|
| Ground carcass | 112 |
| Mill Ends | 16.9 |
| Softening oil, comprising a mixture of equal parts of a coal tar oil and heavy pine tar oil | 9.0 |
| Resin tackifier | 2.3 |
| Carbon black | 11.2 |

The power input rose to approximately 560 H. P. two minutes after the application of the full pressure of the ram. Thereafter, the H. P. input decreased, varying from approximately 385 to 320 H. P. during the ensuing five minutes and decreasing to approximately 250 at nine minutes after the start of the cycle. The average for the nine minute cycle was approximately 2.5 H. P. per pound of material and resulted in increasing the temperature of the batch to approximately 500° F. at the end of the cycle. Cooling of the batch was in the same manner as described with reference to Example I, the temperature thereof being reduced in three minutes to approximately 310° F., at which time the batch was discharged from the mixer. The batch was sheeted in one pass through a rubber mill. This material was refined by two passes through a rubber refiner, the first pass being with the rolls set to give a sheet thickness of 0.005", and the second pass to give a sheet thickness of 0.004". The refined material, though slightly streaky, was soft and tacky. The tailings amounted to 8.3% of the batch. Cured as above stated, the refined reclaim showed a tensile strength of 695 pounds p. s. i., an elongation of 255%, a Mooney plasticity of 84 and a specific gravity of 1.21.

*Example VI*

This example illustrates the practice of the process for the reclaiming of whole truck tires made of GR-S rubber and ground to 6 mesh. The batch formula was as follows:

|  | Pounds |
|---|---|
| Ground whole tire | 104 |
| Mill ends | 15.6 |
| Softening oil, comprising a mixture of equal parts of coal tar oil and heavy pine tar oil | 15.6 |
| Resin tackifier | 5.2 |
| Carbon black | 10.4 |

Upon application of the full pressure of the ram, the work done on the batch resulted in a power input of approximately 600 H. P. at two minutes after the start of the cycle, the power input dropping to approximately 285 H. P. at six minutes after the start of the cycle and to approximately 235 H. P. at eight minutes after the start of the cycle. The temperature of the batch was increased to approximately 510° F. at the end of the eight minutes. The H. P. input for the cycle averaged 2.5 H. P. per pound of material. The batch was cooled in the same manner as described with reference to Example I, its temperature being thereby reduced to approximately 350° F. in three minutes. Thereupon the batch was discharged from the mixer and sheeted in one pass through the rubber mill. This material was refined with 2 passes through a refiner with the rolls set for a sheet thickness of 0.004", giving a reclaim which was clean, though slightly streaky, with tailings amounting to approximately 9% by weight of the batch. Cured in the manner described, the reclaim showed a tensile strength of 945 pounds p. s. i., an elongation of 215%, a Mooney plasticity of 94 and a specific gravity of 1.25.

*Example VII*

In this example, the practice of the process is illustrated with reference to reclaiming a mixture composed of equal parts of scrap rubber of the types referred to in Examples V and VI, viz. a mixture of natural rubber and synthetic rubber (GR-S), each containing substantial amounts of fabric. This scrap mixture was in the form of particles ground to 6 mesh. The batch consisted of the following:

|  | Pounds |
|---|---|
| Ground natural rubber untrimmed passenger tire carcass | 51.6 |
| Ground GR-S rubber whole truck tire | 51.6 |
| Mill ends | 15.5 |
| Softening oil, comprising a mixture of equal parts of a coal tar oil and pine tar | 12.4 |
| Resin tackifier | 3.1 |
| Carbon black | 15.5 |

Upon application of the full pressure of the ram, the power input amounted to approximately 560 H. P. within one minute, fluctuating downwardly during the ensuing three minutes between about 500 H. P. and about 370 H. P., then gradually dropping during the ensuing four minutes to about 235 H. P. For the eight minute cycle, the power input averaged approximately 2.6 H. P. per pound of material. The temperature of the batch was increased to approximately 515° F. at the end of the eight minute cycle. The batch was cooled in the manner described with reference to Example I, the temperature being reduced to approximately 350° F. in two minutes. The batch was discharged from the mixer and one pass through the rubber mill gave a sheet that was soft and tacky. This material was refined in two passes through a refiner with the rolls set to give a sheet thickness of 0.004", resulting in a clean, soft and tacky reclaim, with tailings amounting to approximately 5.3% of the batch. The refined reclaim, cured in the manner described, showed a tensile strength of 1012 pounds p. s. i., an elongation of 235%, a Mooney plasticity of 93 and a specific gravity of 1.24.

*Example VIII*

The scrap in this example consisted of recapped whole tires. For the reason stated in connection with Example IV, the composition of the rubber component of this scrap cannot be stated with any certainty. Nevertheless, a satisfactory reclaim was produced from the recapped tires employed. In this instance, the material was ground to 8 mesh and the batch consisted of the following:

| | Pounds |
|---|---|
| Ground recapped whole tire | 115 |
| Mill ends | 17 |
| Softening agent comprising equal parts of a coal tar oil and heavy pine tar | 14 |
| Resin tackifier | 3.5 |
| Carbon black | 11.5 |

In this operation, the air pressure for operating the ram was increased from an initial 100 pounds p. s. i. (80 pounds p. s. i. by the ram) at about one minute after the start of the cycle to 200 pounds p. s. i (160 pounds p. s. i. by the ram) at about two minutes after the start of the cycle. The power input amounted to 450 H. P. at the end of the first minute and reached approximately 515 H. P. when the maximum pressure had been applied. This pressure was maintained for an additional five minutes during which the power input gradually fell off to approximately 100 H. P., at seven minutes after the start of the cycle, with an average of 2.0 H. P. per pound of material for the seven minute cycle. The temperature of the batch increased during the cycle to approximately 460° F. When this temperature had been reached, the batch was cooled by pouring 6 quarts of water on top of the ram, then lifting the ram to allow the water to be discharged upon the batch, at the same time reducing the speed of the rotors and circulating water through the jacket parts of the mixer. In this way, the temperature of the batch was reduced to approximately 295° F. in about three minutes time. The cooled material was discharged from the mixer and was sheeted on a rubber mill for about four minutes and then refined, the tailings amounting to approximately 2% by weight of the batch. The refined material, when cured, showed a tensile strength of 707 pounds p. s. i., an elongation of 323%, a Mooney plasticity of 54 and a specific gravity of 1.21.

In each of the foregoing examples, the batch contained as a softening agent a mixture of a coal tar oil and pine tar. In lieu of this mixture, the softening agent, particularly where the scrap consists of tire peels, may consist of heavy petroleum oil.

This application is a continuation-in-part of our co-pending application, Serial No. 620,390, filed October 4, 1945.

We claim:

1. A process of treating a scrap vulcanized rubbery butadiene polymer which comprises subjecting a mass of such scrap in a confined working space to intense shearing action while exerting mechanical pressure thereon to compact and densify the mass, the pressure being sufficiently high to enable said shearing action to develop a power input averaging at least about 1.5 horsepower per pound of the scrap for a period of time within the range of approximately three to twelve minutes, the lower the said average horsepower per pound the longer the said period of time and vice versa.

2. A process as defined in claim 1 wherein said scrap vulcanized polymer comprises a vulcanized copolymer of a butadiene and styrene.

3. A process as defined in claim 1 wherein said scrap vulcanized polymer comprises vulcanized natural rubber.

4. A process as defined in claim 1 wherein said scrap vulcanized polymer comprises a mixture of vulcanized natural rubber and a vulcanized copolymer of a butadiene and styrene.

5. A process as defined in claim 1 wherein said scrap vulcanized polymer comprises a vulcanized copolymer of a butadiene and isobutylene.

6. A process as defined in claim 1 wherein said scrap vulcanized polymer comprises a mixture of vulcanized natural rubber and a vulcanized copolymer of a butadiene and isobutylene.

7. A process of treating a scrap vulcanized rubbery butadiene polymer which comprises subjecting a mass of such scrap in a confined working space to intense shearing action while exerting mechanical pressure thereon to compact and densify the mass, the pressure being sufficiently high to enable said shearing action to develop a power input averaging at least about 1.5 horsepower per pound of the scrap for a period of time within the range of approximately three to approximately twelve minutes whereby the mass is caused to attain a temperature within the range of approximately 425° F. to 550° F., the lower the said average horsepower per pound the longer the said period of time and vice versa.

8. A process as defined in claim 7 wherein said scrap vulcanized polymer comprises a vulcanized copolymer of a butadiene and styrene.

9. A process as defined in claim 7 wherein said scrap vulcanized polymer comprises vulcanized natural rubber.

10. A process as defined in claim 7 wherein said scrap vulcanized polymer comprises a mixture of vulcanized natural rubber and a vulcanized copolymer of a butadiene and styrene.

11. A process as defined in claim 7 wherein said scrap vulcanized polymer comprises a vulcanized copolymer of a butadiene and isobutylene.

12. A process as defined in claim 7 wherein said scrap vulcanized polymer comprises a mixture of vulcanized natural rubber and a vulcanized copolymer of a butadiene and isobutylene.

13. A process of treating a scrap vulcanized rubbery butadiene polymer which comprises subjecting a mass of such scrap in a confined working space to intense shearing action while exerting mechanical pressure thereon to compact and densify the mass, the pressure being sufficiently high to enable said shearing action to develop a power input averaging at least about 2.0 horsepower per pound of the scrap for a period of time within the range of approximately seven to ten minutes.

14. A process of treating a scrap vulcanized rubbery butadiene polymer which comprises subjecting a mass of such scrap in a confined working space to intense shearing action while exerting mechanical pressure thereon to compact and densify the mass, the pressure being sufficiently high to enable said shearing action to develop a power input averaging from 1.6 to 2.6 horsepower per pound of the scrap for a period of time within the range of approximately seven to approximately twelve minutes, the lower the said average horsepower the longer the said period of time and vice versa.

15. A process as defined in claim 14 wherein said scrap vulcanized polymer comprises a vulcanized copolymer of a butadiene and styrene.

16. A process as defined in claim 14 wherein said scrap vulcanized polymer comprises vulcanized natural rubber.

17. A process as defined in claim 14 wherein said scrap vulcanized polymer comprises a mixture of vulcanized natural rubber and a vulcanized copolymer of a butadiene and styrene.

18. A process as defined in claim 14 wherein said scrap vulcanized polymer comprises a vulcanized copolymer of a butadiene and isobutylene.

19. A process as defined in claim 14 wherein said scrap vulcanized polymer comprises a mixture of vulcanized natural rubber and a vulcanized copolymer of a butadiene and isobutylene.

20. A process of treating a scrap vulcanized rubbery butadiene polymer which comprises subjecting a mass of the scrap in a confined working space to the shearing action of a bladed rotor in an internal mixer while exerting mechanical pressure thereon to compact and densify the mass, the pressure being sufficiently high and so related to the speed of the motor as to enable said shearing action to develop power input averaging at least about 1.5 horsepower per pound of material for a period of time within the range of approximately three to approximately twelve minutes, whereby the mass is caused to attain a temperature within the range of approximately 425° to 550° F., the lower the said average horsepower per pound the longer the said period of time and vice versa, cooling the mass at the end of said period of time to a temperature within the range of 250° to 350° F., and then discharging the mass from the zone of action.

FERNLEY H. BANBURY.
DONALD A. COMES.
CARL F. SCHNUCK.

REFERENCES CITED

The following references are of record in the file of this patent:

UNITED STATES PATENTS

| Number | Name | Date |
| --- | --- | --- |
| 866,759 | Wheeler et al. | Sept. 24, 1907 |
| 2,408,296 | Cotton et al. | Sept. 24, 1946 |
| 2,423,033 | Le Beau | June 24, 1947 |

FOREIGN PATENTS

| Number | Country | Date |
| --- | --- | --- |
| 577,829 | Great Britain | June 3, 1946 |